United States Patent [19]

Desport

[11] Patent Number: 4,695,032

[45] Date of Patent: Sep. 22, 1987

[54] CONVERTIBLE MOULD

[75] Inventor: Lucien A. Desport, Paris, France

[73] Assignee: Engineering Management Data Processing (E.M.D.P.), Paris, France

[21] Appl. No.: 765,916

[22] Filed: Aug. 14, 1985

[30] Foreign Application Priority Data

Aug. 31, 1984 [FR] France .............................. 84 13506

[51] Int. Cl.⁴ ........................................... B29C 41/38
[52] U.S. Cl. .................................. 249/112; 114/359; 249/155; 249/219 R; 425/470
[58] Field of Search .................. 249/24, 29, 155, 159, 249/209, 212, 219 R, 112, 115; 425/470; 264/32, 316, 309; 114/355, 357, 359

[56] References Cited

U.S. PATENT DOCUMENTS

| 1,301,364 | 4/1919 | Biggs | 249/159 |
| 1,307,470 | 6/1919 | Yeomans | 249/159 |
| 1,406,117 | 2/1922 | Vrooman | 33/176 |
| 2,410,888 | 11/1946 | Lucy | 249/155 |
| 2,431,100 | 11/1947 | Woods | 33/529 |
| 2,519,508 | 8/1950 | Schnorbus | 33/176 |
| 3,749,594 | 7/1973 | Bibb | 114/357 |
| 4,398,693 | 8/1983 | Hahn et al. | 249/155 |

FOREIGN PATENT DOCUMENTS

| 249443 | 7/1912 | Fed. Rep. of Germany | 249/209 |
| 2019044 | 11/1970 | Fed. Rep. of Germany | 182/179 |
| 445720 | 11/1912 | France | 249/209 |
| 1068951 | 7/1954 | France | 249/209 |
| 2271368 | 12/1975 | France | 249/155 |
| 582794 | 11/1946 | United Kingdom . | |
| 1425312 | 2/1976 | United Kingdom | 249/155 |

OTHER PUBLICATIONS

"Savway Flying Forms" Sales Brochure, Savway Steel Products, Milwaukee, WI, Form No. 2-117, 1968.
French, Thomas E., *A Manual of Engineering Drawing*, 7th Ed., McGraw-Hill Book Company, NY, NY, (1947), pp. 81, 434 and 435.

Primary Examiner—Jay H. Woo
Assistant Examiner—James C. Housel
Attorney, Agent, or Firm—Pearne, Gordon, McCoy & Granger

[57] ABSTRACT

A convertible mould comprising a frame including bars and beams carrying movable heads supporting a lattice of slats in a desired configuration. A conforming sheet material is fixed to the slats to provide a mould surface.

10 Claims, 7 Drawing Figures

CONVERTIBLE MOULD

This invention relates to moulds and the method of producing them. It relates more particularly to moulds for moulding objects having non-developable surfaces. The invention will be illustrated more particularly by the example of a boat hull but it goes without saying that it is also applicable to other objects moulded using a simple female mould, a simple male mould, or a closed mould, these objects, consisting, for example, of polyester resin, epoxy resin or some other thermosetting resin, ordinary cement or any other suitable material.

It is already known to mould boat hulls using a mould. Any change in the dimensions or shape of the hull makes it necessary to use a different mould. This process is expensive.

The invention remedies this disadvantage by providing a convertible mould the greater part of which can be used to mould hulls of different shapes and dimensions.

The convertible mould according to the invention comprises a frame having bars extending in planes, rows of head holders mounted on these bars so as to be capable of being fixed thereon in different positions, each row extending in one of the planes, heads held by the ends of the head holders, primary slats supported by the heads, each slat being supported by all the heads in one row, secondary slats interlaced with the primary slats and fixed thereto, and sheets or covers applied to the secondary slats.

Therefore, in order to convert the mould, one has only to modify the position of the heads and then apply the slats and sheets thereto. Since the elements of the frame, which is preferably demountable, the head holders, the means for fixing them in different positions and the heads themselves represent the most expensive components of the mould, a universal mould is thus produced which can be used to mould any boat.

To ensure that each row of heads defines a curve which the primary slat will follow without any deformation at the point of contact, it is generally advisable for one of the linear dimensions of the contact surface of a head with the primary slat to be less than about 1/500th of the radius of the curvature of the slat at this point. Generally, the contact surface area of a head with a slat is between 2 mm and 10 mm.

Generally, the rows of heads are arranged so that they define the timbers of the boat. The secondary slats can then define the water lines of the boat. To prevent the secondary slats from warping or twisting and to ensure that they remain parallel to the plane at a tangent to the surface of the hull, it is extremely important that the surface area of contact of each head can be oriented so as to adapt to the principal lines of the hull, i.e. the timbers and the water lines. For this reason, according to a preferred feature of the invention, each head can be oriented in two directions which differ from the direction in which the head holder extends.

The best results are obtained when each head is arranged so that it can rotate about two orthogonal axes, at least one of which is imaginary. The two axes are not necessary coplanar. One of them, which is always imaginary, is preferably in the plane at a tangent to the mould. The other may be real or imaginary and, in the latter case, preferably passes through the point of contact of the head with the primary slat. In this way, local deformation of the slats at the points where they are supported is prevented as far as possible.

The primary slats should have sufficient rigidity so that they do not bend between the support points formed by the heads when they receive the load of the material constituting the hull. For this purpose, the heads may be made as close together as necessary, although obviously, since the heads and the means by which they can be displaced represent a costly investment, it is advisable to have as few heads as possible. For a boat hull weighing 25 kg/m$^2$, a spacing between the heads in a row of between 0.30 m and 0.50 m may be used. It is also possible to provide simple supports for the slats between the heads. Finally, to achieve the best compromise between the strength which the slats should have and the need to bend them in order to fit them to the curvature required for the shape of the hull, it is provided that the primary slats consist of laminate having a rigidity of more than $35 \times 10^6$ kg/mm$^2$ and a deflection of less than 0.1 mm between two support points spaced 0.35 m apart.

The process for manufacturing the mould according to the invention consists in producing the laminated primary slats by applying successive layers which form single slats over a first layer supported by the heads. Each layer is able to deform easily, without having the required strength, but the laminate thus produced has the required strength.

The secondary slats may be placed closer together since this incurs hardly any extra cost caused by the necessity of using more heads. For this reason, preferably, the distance between the secondary slats is approximately half the distance between the primary slats, given that the secondary slats may be complemented by diagonal slats.

The sheets or covers which are applied to the lattice formed by all the slats should have sufficient flexibility to take the shape of the desired surface, but sufficient rigidity to withstand the stresses and give a deflection of less than 0.1 mm, for example.

This double characteristic can be attained by using woven glass material impregnated with resin, notably polyurethane resin, having its greatest strength in the direction of least curvature of the hull.

In the accompanying drawings, which are given solely by way of example:

Figure 1:
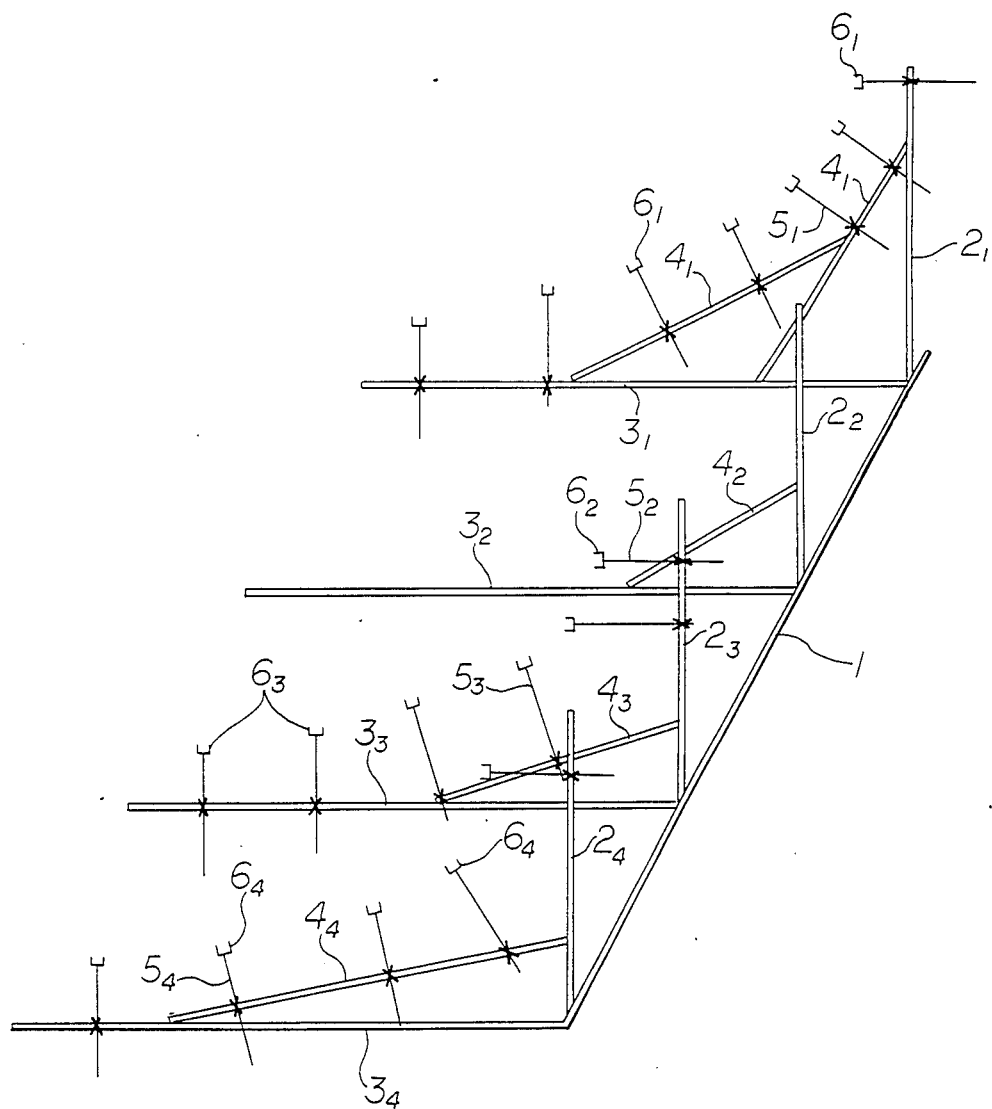
FIG. 1 is a partial persective view of a frame on which the slats have not yet been placed.

In FIG. 1, the frame consists of a crossbeam 1 on which are fixed uprights $2_1$, $2_2$, $2_3$ and $2_4$ and horizontal longitudinal beams $3_1$, $3_2$, $3_3$ and $3_4$. Bars $4_1$, $4_2$, $4_3$ and $4_4$ are fixed to these uprights and longitudinal beams. The two bars $4_1$ extend in a plane parallel to that of the bar $4_2$ and the parallel planes in which the bars extend are equidistant. Mounted on the longitudinal beams and, in some cases, on the uprights, there are head holders $5_1$, 5₂, 5₃ and 5₄ which can be displaced, using systems of jacks or screws, so that the heads 6₁, 6₂, 6₃ and 6₄ carried by each head holder can take up a prescribed position. The row of heads 6₁ thus defines a curve which corresponds to the curve of a timber of the hull of the boat.

Figure 2:
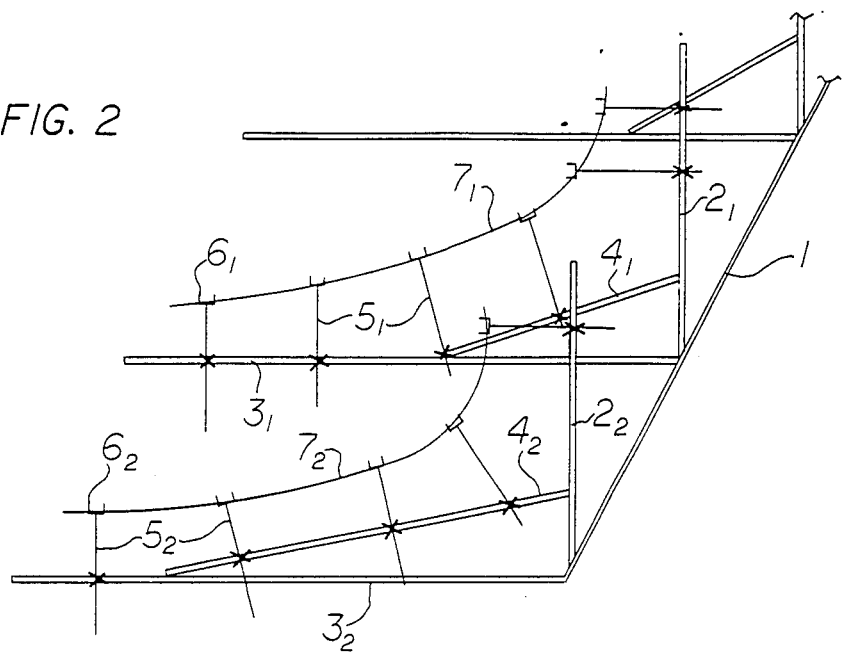
FIG. 2 is a partial perspective view of a frame fitted with a first constituent layer of the primary slats.
Figure 3:
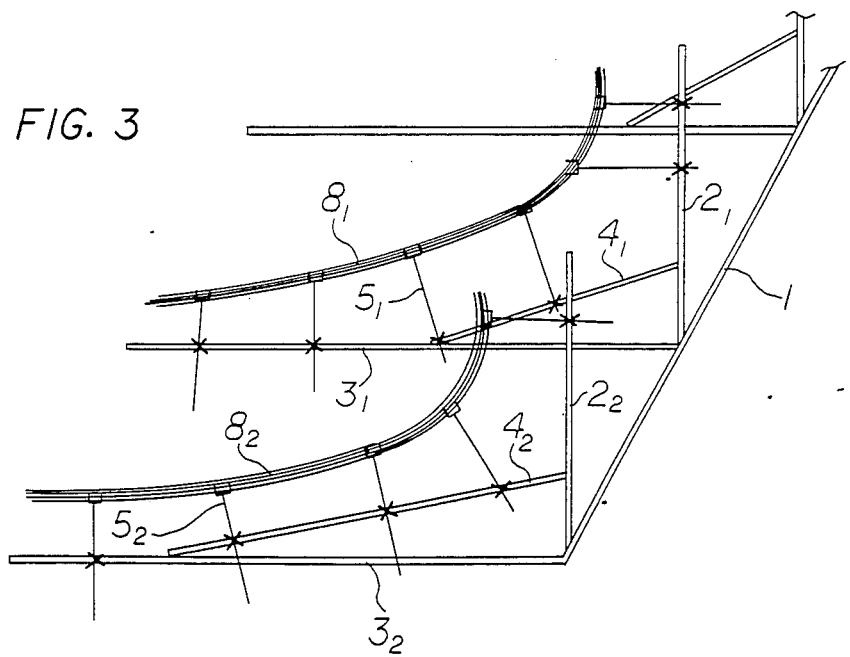
FIG. 3 is a vew similar to that of FIG. 2 but with the laminated primary slats completed.
Figure 4:
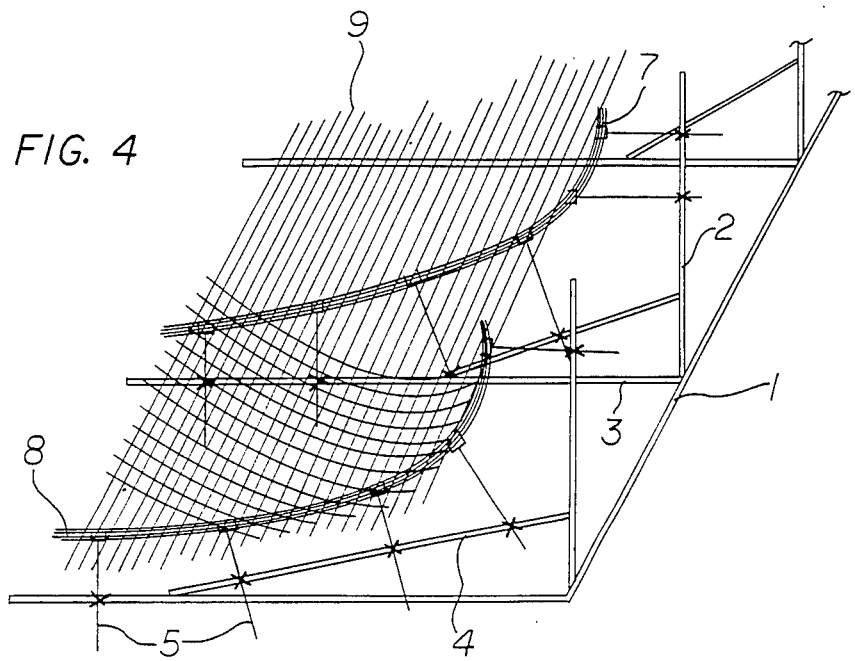
FIG. 4 is a view similar to FIG. 3 with the secondary slats in place.

In FIG. 2 a first layer 7₁ of primary slats has been placed on the row of heads 6₁ and a first layer 7₂ on the row of heads 6₂. In FIG. 3, the first layers 7₁ and 7₂ have been completed by four other layers superimposed thereon so as to create the primary slats 8₁ and 8₂. The first layer 7₂ is a layer of polyvinyl chloride 2 mm thick, the second layer is a layer of polyester 2 mm thick, the third layer is a layer of polyvinyl chloride 14 mm thick, the fourth layer is a layer of polyester 2 mm thick and the fifth layer is a layer of polyvinyl chloride 2 mm thick. In FIG. 4, secondary slats 9 are fixed by adhesive bonding to the primary slats 8, perpendicular thereto. Although this is not shown in FIG. 4, it is possible to produce the slats 9 in the same way as the slats 8 if the curvature of the slats so requires.

Figure 5:
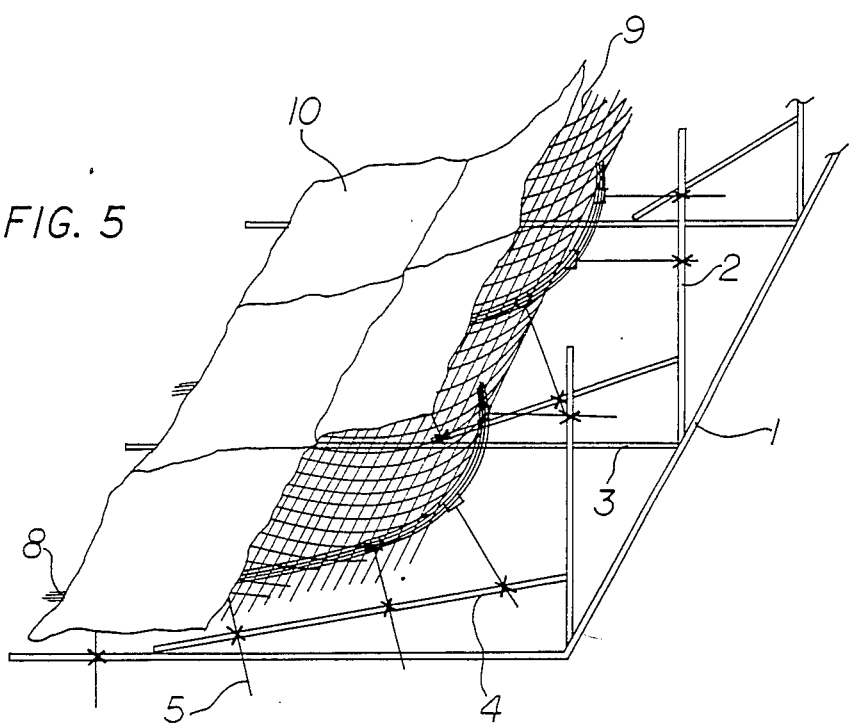
FIG. 5 is a view similar to that of FIG. 4 with a certain number of sheets in place.

In FIG. 5, pieces of sheet 10 have been adhesively bonded to the lattice formed by the slats 8 and 9 and have been fitted end to end so as to obtain a surface which forms the mould for a boat hull.

When moulding is complete, the slats 8 and 9 and the sheet 10 are removed and, in order to mould a boat of a different shape, the position of the heads 6 is altered, whilst the arrangement of the frame is modified if necessary.

Figure 6:
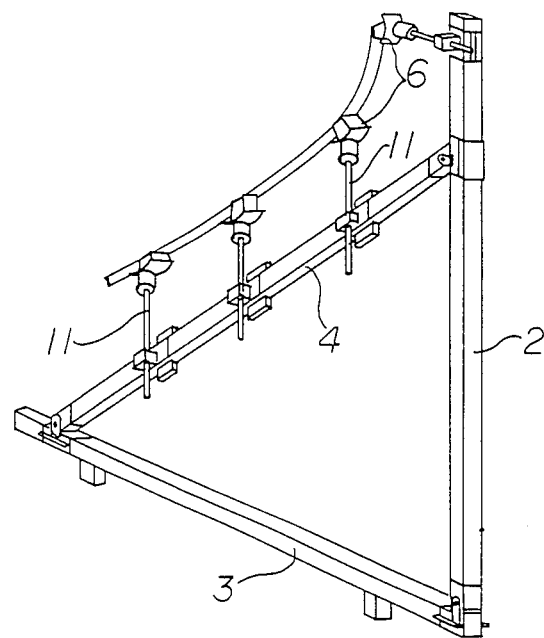
FIG. 6 is a perspective view of the frame and the head holders.

FIG. 6 shows the way in which the position of the heads 6 can be varied. Each head is integral with the rod 11 of a jack so that the heads can be displaced in the direction in which the rods extend.

Figure 7:
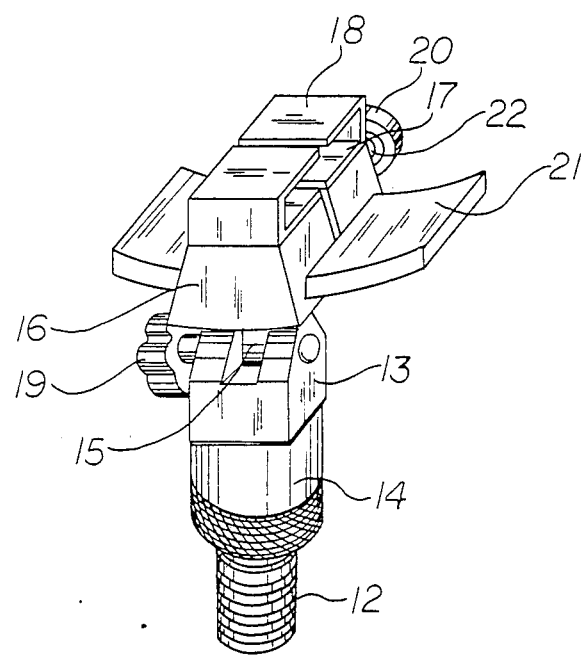
FIG. 7 is a perspective view illustrating one embodiment of a head.

FIG. 7 shows an alternative embodiment of heads according to the invention. A screw 12 integral with a bearing fork 13 and capable of being screwed into a nut 14 makes it possible to vary the spacing of the head from the bar 4. The axis 15 of the bearing fork 13 is integral with a part 21 consisting of a circular cylindrical element the generator of which is at right angles to the axis 15. By releasing the axis 15 using a knob 19 the part 21 can be made to rotate about this axis 15. A part 16 made up of two jaws joined by a screw 22 and clamping the part 21 into position can be displaced over the part 21 parallel to the generators of the latter or can be locked into position using a locking knob 20. Straps 18 are integral with the part 16 and provide contact surface 17 which may serve as a flat support for the primary slats. The respective perpendicular positions of the axis 15 and the axis of the geometric cylinder of which the part 21 is an element make it possible to give any desired predetermined orientation to the plane provided by the straps 18.

The jaws are thus gripping means for gripping slats. The gripping means are mounted so as to be able to be shifted transversely to the plane of the row and to fit to the shift of a slat which is due to its torsion.

I claim:

1. A convertible mould for moulding an object having a surface with first principal lines which extend in first parallel planes and second principal lines which extend in second parallel planes intersecting the first planes, comprising a frame, a plurality of rows each having a plurality of head-holders mounted on the frame, each row extending in one of said first planes, a head supported by each head-holder, primary slats having longitudinal dimensions substantially greater than their lateral dimensions, secondary slats interlaced with the primary slats and fixed thereon, each head including means for supporting said primary slats with the longitudinal dimensions thereof extending along said first principal lines, the support means being pivotable about an axis parallel to the first principal line to allow support of a principal slat in a twisted condition that accommodates the configuration of an adjacent secondary slat thereby allowing the primary and secondary slats to locally conform to said surface, and sheets applied to the secondary slats.

2. The mould of claim 1, wherein said support means includes a contact surface with said primary slat which has a length less than about 1/500th of the radius of curvature of the primary slat adjacent the contact surface.

3. The mould of claim 1, wherein said frame includes a plurality of demountable bars, said head-holders are adjustably threadedly fixed to the bars with a predetermined distance between the bar and head, and each of said heads is pivotable about a second axis which is orthogonal with respect to the first mentioned axis.

4. The mould of claim 3, wherein one of said axes is tangent to the surface of the mould.

5. The mould of claim 3, wherein one of said axes is located in the plane of the contact surface of the head with the primary slat.

6. The mould of claim 3, wherein said support means comprise gripping jaws including said contact surfaces for gripping said primary slats and shifting said slats in a direction orthogonal to the planes of the gripping jaws to substantially align the primary slats with said first principal lines.

7. The mould of claim 2, wherein said primary slat is a laminate which is composed of a plurality of elementary slats fitting on a first slat.

8. The mould of claim 1, wherein said frame comprises bars extending in said first planes and said head-holders are fixed on the bars in predetermined positions.

9. The mould of claim 1, wherein said frame comprises demountable bars extending in said first planes in predetermined locations.

10. The mould of claim 1, wherein said support means are adjustable to substantially align said primary slats along said first lines.

* * * * *